United States Patent
Shi (10) Patent No.: US 12,016,053 B2
(45) Date of Patent: Jun. 18, 2024

(54) RANDOM ACCESS METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 673 days.

(21) Appl. No.: 17/163,875

(22) Filed: Feb. 1, 2021

(65) Prior Publication Data
US 2021/0160927 A1 May 27, 2021

Related U.S. Application Data

(63) Continuation of application No. PCT/CN2019/094281, filed on Jul. 1, 2019.

(30) Foreign Application Priority Data

Aug. 1, 2018 (CN) .......................... 201810865921.2
Sep. 17, 2018 (CN) .......................... 201811082392.5

(51) Int. Cl.
 H04W 74/0833 (2024.01)
 H04L 41/0668 (2022.01)
 H04W 74/0816 (2024.01)

(52) U.S. Cl.
 CPC ..... *H04W 74/0833* (2013.01); *H04L 41/0668* (2013.01); *H04W 74/0816* (2013.01)

(58) Field of Classification Search
None
See application file for complete search history.

(56) References Cited

U.S. PATENT DOCUMENTS

| 11,013,036 B2 * | 5/2021 | Li ..................... H04L 27/26132 |
| 2016/0302076 A1 * | 10/2016 | Chou ................ H04W 52/0225 |
| 2019/0253200 A1 * | 8/2019 | Salem ................ H04W 74/0808 |

(Continued)

FOREIGN PATENT DOCUMENTS

| CN | 106060937 A | 10/2016 |
| CN | 106686727 A | 5/2017 |

(Continued)

OTHER PUBLICATIONS

Huawei et al., "Coexistence and channel access for NR unlicensed band operations," 3GPP TSG RAN WG1 Meeting #93, R1-1805919, May 2018, 6 pages.

(Continued)

*Primary Examiner* — Faiyazkhan Ghafoerkhan
(74) *Attorney, Agent, or Firm* — Hodgson Russ LLP (57) ABSTRACT

A random access method, a terminal device, and a network device. The method is applied to an unlicensed band, comprising: a terminal device determines a target uplink bandwidth part (BWP) by means of Listen Before Talk (LBT); the terminal device initiates a random access process on the target uplink BWP. The terminal device determines the target uplink BWP by means of the LBT, and initiates the random access process on the target uplink BWP, and therefore can implement random access on an unlicensed band.

12 Claims, 2 Drawing Sheets

(56) References Cited

U.S. PATENT DOCUMENTS

| | | | |
|---|---|---|---|
| 2021/0007101 A1* | 1/2021 | Tooher | H04W 72/0446 |
| 2021/0099259 A1* | 4/2021 | Salem | H04W 74/0816 |
| 2021/0160927 A1* | 5/2021 | Shi | H04W 74/0833 |
| 2021/0274555 A1* | 9/2021 | Alfarhan | H04W 74/0808 |
| 2023/0239848 A1* | 7/2023 | Tooher | H04W 72/0453 |
| | | | 370/329 |

FOREIGN PATENT DOCUMENTS

| | | |
|---|---|---|
| CN | 106937404 | 7/2017 |
| CN | 107079496 | 8/2017 |
| CN | 107517501 | 12/2017 |
| DE | 112019004716 T5 | 6/2021 |
| EP | 3352522 | 7/2018 |
| ES | 2759624 T3 | 5/2020 |
| ES | 2917412 T3 | 7/2022 |
| ES | 2925776 T3 | 10/2022 |
| WO | 2019160720 A1 | 8/2019 |

OTHER PUBLICATIONS

WIPO, ISR and WO for PCT/CN2019/094281, Sep. 5, 2019.

Mediatek Inc. et al., "On selecting UL BWP for CBRA," 3GPP TSG-RAN WG2 Meeting #102, R2-1807267 (Revision of R2-1806165), May 2018.

Vivo, "RACH enhancement in NR-U," 3GPP TSG-RAN WG2 NR AH1807 Meeting, R2-1809863, Jul. 2018.

ZTE, "Considerations on channel access procedure for NR-U," 3GPP TSG RAN WG2 NR AH1807 Meeting, R2-1809841, Jul. 2018.

JPO, Office Action for JP Application No. 2021-505747, Jun. 16, 2023.

EPO, Extended European Search Report for EP Application No. 19843819.4, Aug. 3, 2021.

Huawei et al., "Remaining issues on bandwidth part and wideband operation," 3GPP TSG RAN WG1 NR Ad Hoc Meeting, R1-1800018, Jan. 2018, 14 pages.

Sony, "NR unlicensed design considerations," 3GPP TSG RAN WG1 Meeting #92, R1-1802066, Feb. 2018, 4 pages.

Nokia, "Potential solutions and techniques for NR unlicensed," 3GPP TSG RAN WG1 Meeting #92, R1-1802526, Feb. 2018, 10 pages.

TIPO, Office Action for TW Application No. 108127344, Mar. 15, 2023.

EPO, Communication for EP Application No. 19843819.4, Mar. 16, 2023.

CNIPA, Office Action for CN 202110145783.2, Jul. 12, 2022.

Intel Corporation, "Random Access Procedure for NR-u", 3GPP TSG-RAN WG2 NR AdHoc #1807, Jul. 2, 2018, R2-1809788, 4 pages, Canada.

LG Electronics, "Channel Access Procedure for NR Unlicensed Operation", 3GPP TSG RAN WG1 Meeting #93, May 21, 2018, R1-1806645, 6 pages, Korea.

Sony, "High Level Views on NR-U BWP", 3GPP TSG RAN WG1 Meeting 91, Nov. 27, 2017, R1-1720475, 4 pages, US.

CNIPA, Notice of Priority Review of Patent Application for CN 202110145783.2, Jun. 28, 2022.

EPO, Office Action for EP Application No. 19843819.4, Sep. 2, 2022.

TIPO, Taiwanese First Office Action for TW Application No. 108127344, Sep. 26, 2022.

IPI, Office Action for IN Application No. 202127004418, Jan. 10, 2022.

EPO, Communication for EP Application No. 19843819.4, Mar. 7, 2022.

IPA, Office Action for AU Application No. 2019313311, Feb. 21, 2024.

* cited by examiner

RANDOM ACCESS METHOD, TERMINAL DEVICE, AND NETWORK DEVICE

CROSS-REFERENCE TO RELATED APPLICATIONS

This application is a continuation of International Application No. PCT/CN2019/094281, filed Jul. 1, 2019, which claims priority to Chinese Patent Application No. 201810865921.2, filed with the Chinese Patent Office on Aug. 1, 2018, titled "Random Access Method, Terminal Device, and Network Device", and the present application also claims priority to Chinese Patent Application No. 201811082392.5, filed with the Chinese Patent Office on Sep. 17, 2018, titled "Random Access Method, Terminal Device, and Network Device", the entire contents of which are incorporated herein by reference.

TECHNICAL FIELD

The embodiments of the present application relate to the field of communication technologies, and more particularly, to a random access method, a terminal device, and a network device.

BACKGROUND

At present, Long Term Evolution (LTE) supports the use of unlicensed spectrum by the way of Carrier Aggregation (CA). Specifically, a Primary Cell (PCell) works on a licensed spectrum and provides basic access functions and data transmission functions; and a Secondary Cell (SCell) works on the unlicensed spectrum for the purpose of data boosting. In Licensed-Assisted Access (LAA) work mode of LTE, a Physical Random Access Channel (PRACH) is accessed through the PCell. Therefore, there is no relevant PRACH access technical solution for the unlicensed frequency band.

However, New Radio (NR) supports stand-alone (SA). The SA means that a terminal device implements PCell functions and SCell functions on the unlicensed frequency band, and for the stand-alone, a PRACH access procedure also needs to be completed on the unlicensed spectrum.

Therefore, how to implement the random access on the unlicensed spectrum is a technical problem that needs to be solved urgently in the art.

SUMMARY

There is provided a random access method, a terminal device and a network device, which can implement random access on the unlicensed spectrum.

In a first aspect, there is provided a random access method. The method is applied to an unlicensed frequency band, and the method includes: determining, by a terminal device, a target uplink Bandwidth Part (BWP) by Listen Before Talk (LBT); and initiating, by the terminal device, a random access procedure on the target uplink BWP.

In some possible implementations, the method further includes: switching, by the terminal device, a currently activated downlink BWP to a downlink BWP with a same index as the target uplink BWP.

In some possible implementations, the determining, by terminal device, the target uplink Bandwidth Part (BWP) by Listen Before Talk (LBT) includes: when the terminal device performs LBT on the currently activated first uplink BWP and succeeds, determining the first uplink BWP as the target BWP, where the first BWP is configured with a contention-based random access resource, and/or the first BWP is configured with a non-contention based random access resource.

In some possible implementations, the initiating, by the terminal device, the random access procedure on the target uplink BWP includes: initiating, by the terminal device, a contention-based random access procedure on the target uplink BWP.

In some possible implementations, the method includes: when the terminal device performs LBT on the currently activated first uplink BWP and fails, switching the currently activated uplink BWP from the first uplink BWP to a second uplink BWP, where the second uplink BWP is an uplink BWP configured by a network device; and when the terminal device performs LBT on the second uplink BWP and succeeds, determining the second uplink BWP as the target BWP.

In some possible implementations, the second uplink BWP is configured with a contention-based random access resource.

In some possible implementations, when the terminal device performs LBT on the currently activated first uplink BWP and fails, switching the currently activated uplink BWP from the first uplink BWP to the second uplink BWP, includes: when the terminal device performs LBT on the currently activated first uplink BWP and a number of failures is greater than or equal to a first threshold value, switching the currently activated uplink BWP from the first uplink BWP to the second uplink BWP.

In some possible implementations, the first threshold value is a preset threshold value, or the first threshold value is a threshold value configured by the network device.

In some possible implementations, when the terminal device performs LBT on the currently activated first uplink BWP and fails, switching the currently activated uplink BWP from the first uplink BWP to the second uplink BWP, includes: when the terminal device performs LBT on the currently activated first uplink BWP and fails, and a backoff duration is greater than or equal to a second threshold value, switching the currently activated uplink BWP from the first uplink BWP to the second uplink BWP.

In some possible implementations, the second threshold value is a preset threshold value, or the second threshold value is a threshold value configured by the network device.

In some possible implementations, the determining, by the terminal device, the target uplink Bandwidth Part (BWP) by Listen Before Talk (LBT), includes: performing, by the terminal device, LBT on at least one uplink BWP configured by the network device, where the at least one uplink BWP includes the currently activated first uplink BWP; and determining, by the terminal device, the target uplink BWP from the uplink BWP on which the LBT is successfully performed.

In some possible implementations, each uplink BWP in the at least one uplink BWP is configured with a contention-based random access resource.

In some possible implementations, the determining, by the terminal device, the target uplink BWP from the uplink BWP on which the LBT is successfully performed, includes: when the terminal device determines that the uplink BWP on which the LTB is successfully performed includes the first uplink BWP, determining the first uplink BWP as the target uplink BWP.

In some possible implementations, the determining, by the terminal device, the target uplink BWP from the uplink BWP on which the LBT is successfully performed, includes:

when the terminal device determines that the uplink BWP on which the LTB is successfully performed does not include the first uplink BWP, randomly selecting one uplink BWP from the uplink BWP on which LBT is successfully performed and determining the selected uplink BWP as the target BWP.

In some possible implementations, the method further includes: when the terminal device determines that LBT is not successfully performed on the at least one uplink BWP, continuing to perform LBT on the at least one uplink BWP until the at least one uplink BWP includes an uplink BWP on which LBT is successfully performed.

In some possible implementations, the initiating, by the terminal device, the random access procedure on the target uplink BWP includes: initiating, by the terminal device, a non-contention based random access procedure on the target uplink BWP.

In some possible implementations, before the determining, by the terminal device, the target uplink Bandwidth Part (BWP) by Listen Before Talk (LBT), the method further includes: receiving, by the terminal device, indication information sent by a network device, where the indication information is configured to indicate a PRACH resource used when the terminal device initiates a non-contention based random access procedure;

where the determining, by the terminal device, the target uplink Bandwidth Part (BWP) by Listen Before Talk (LBT), includes:

when LBT is successfully performed on an uplink BWP where the PRACH resource is located, determining, by the terminal device, the uplink BWP where the PRACH resource is located as the target uplink BWP.

In some possible implementations, the receiving, by the terminal device, the indication information sent by the network device includes: receiving, by the terminal device, a Physical Downlink Control CHannel (PDCCH) signaling sent by the network device, the PDCCH signaling including the indication information.

In some possible implementations, the receiving, by the terminal device, the indication information sent by the network device includes: receiving, by the terminal device, a Radio Resource Control (RRC) signaling sent by the network device, the RRC signaling including the indication information.

In some possible implementations, the receiving, by the terminal device, the indication information sent by the network device includes: receiving, by the terminal device, a Media Access Control (MAC) Control Element (CE) sent by the network device, the MAC CE including the indication information.

In a second aspect, there is provided a random method, the method is applied to an unlicensed frequency band, and the method includes: determining, by a network device, a target downlink Bandwidth Part (BWP) by Listen Before Talk (LBT); and responding to, by the network device, a random access procedure initiated by the terminal device on the target downlink BWP.

In some possible implementations, the method further includes: determining, by the network device, a downlink BWP with a same index as the target uplink BWP as the target downlink BWP, where the target uplink BWP is the uplink BWP used when the terminal device initiates a random access procedure.

In some possible implementations, the responding to, by the network device, the random access procedure initiated by the terminal device on the target downlink BWP includes: responding to, by the network device, a contention-based random access procedure initiated by the terminal device on the target downlink BWP.

In some possible implementations, the responding to, by the network device, the random access procedure initiated by the terminal device on the target downlink BWP includes: responding to, by the network device, a non-contention based random access procedure initiated by the terminal device on the target downlink BWP.

In some possible implementations, before the determining, by the network device, the target downlink Bandwidth Part (BWP) by Listen Before Talk (LBT), the method further includes: sending, by the network device, indication information to the terminal device, where the indication information is configured to indicate a PRACH resource used when the terminal device initiates a non-contention based random access procedure; and the target uplink BWP is the uplink BWP where the PRACH resource is located.

In some possible implementations, the sending, by the network device, indication information to the terminal device includes: sending, by the network device, a Physical Downlink Control CHannel (PDCCH) signaling to the terminal device, the PDCCH signaling including the indication information.

In some possible implementations, the sending, by the network device, indication information to the terminal device includes: sending, by the network device sends, a Radio Resource Control (RRC) signaling to the terminal device, the RRC signaling including the indication information.

In some possible implementations, the sending, by the network device, indication information to the terminal device includes: sending, by the network device, a Media Access Control (MAC) Control Element (CE) to the terminal device, the MAC CE including the indication information.

In a third aspect, there is provided a communication device, configured to perform the methods in any of the foregoing first to second aspects or the methods in any of the foregoing possible implementations.

In some possible implementations, the communication device includes: a functional module, configured to perform the methods in any of the foregoing first to second aspects or the methods in any of the foregoing possible implementations.

In some possible implementations, the communication device is a terminal device, and the terminal device is configured to perform the methods in the foregoing first aspect or any possible implementations of the foregoing first aspect.

In some possible implementations, the communication device is a network device, and the network device is configured to perform the methods in the foregoing second aspect or any possible implementations of the foregoing second aspect.

In a fourth aspect, there is provided a communication device, including: a processor, configured to call and run a computer program from a memory, the computer program being configured to perform the methods in any of the foregoing first to second aspects or the methods in any of the foregoing possible implementations.

In some possible implementations, the communication device further includes: a memory, the memory is configured to store the computer program.

In some possible implementations, the communication device is a terminal device, and the terminal device is configured to perform the methods in the foregoing first aspect or any possible implementations of the foregoing first aspect.

In some possible implementations, the communication device is a network device, and the network device is configured to perform the methods in the foregoing second aspect or any possible implementations of the foregoing second aspect.

In a fifth aspect, there is provided a chip, being configured to perform the methods in any of the foregoing first to second aspects or the methods in any of the foregoing possible implementations.

In some possible implementations, the chip includes: a processor, configured to call and run a computer program from a memory, the computer program being configured to perform the methods in any of the foregoing first to second aspects or the methods in any of the foregoing possible implementations.

In some possible implementations, the chip further includes: a memory, the memory being configured to store the computer program.

In a sixth aspect, there is provided a computer-readable storage medium, the storage medium is configured to store a computer program, and the computer program is configured to perform the methods in any of the foregoing first to second aspects or the methods in any of the foregoing possible implementations.

In a seventh aspect, there is provided a computer program product, including computer program instructions, and the computer program is configured to perform the methods in any of the foregoing first to second aspects or the methods in any of the foregoing possible implementations.

In an eighth aspect, there is provided a computer program, which when running on a computer enables the computer to perform the methods in any of the foregoing first to second aspects or the methods in any of the foregoing possible implementations.

In a ninth aspect, there is provided a communication system, including a terminal device and a network device; where
the terminal device is configured to: determine a target uplink Bandwidth Part (BWP) by Listen Before Talk (LBT), and initiate a random access procedure on the target uplink BWP; and the network device is configured to: determine a target downlink Bandwidth Part (BWP) by Listen Before Talk (LBT), and respond to a random access procedure initiated by the terminal device on the target uplink BWP.

In some possible implementations, the terminal device is configured to perform the methods in the foregoing first aspect or the methods in any of the foregoing possible implementations, and the network device is configured to perform the methods in any aspect of the foregoing second aspect or in its various implementations.

Based on the foregoing technical solutions, a terminal device determines a target uplink BWP by Listen Before Talk (LBT), and initiates a random access procedure on the target uplink BWP, which can implement the random access on an unlicensed frequency band.

In a tenth aspect, there is provided a method for transmitting data, the method is applied to an unlicensed frequency band, and the method includes: determining, by a terminal device, a target uplink Bandwidth Part (BWP) by Listen Before Talk (LBT); and transmitting, by the terminal device, data using a target resource on the target uplink BWP.

In some possible implementations, before the transmitting, by the terminal device, data using the target resource on the target uplink BWP, the method further includes: receiving, by the terminal device, configuration information sent by a network device, the configuration information being used to configure the target resource for the terminal device.

In some possible implementations, the receiving, by the terminal device, the configuration information sent by the network device, includes: receiving, by the terminal device, a Radio Resource Control (RRC) signaling sent by the network device, the RRC signaling including the configuration information.

In some possible implementations, the method further includes: receiving, by the terminal device, downlink control information (DCI) sent by the network device, the DCI being used to activate the target resource.

In some possible implementations, the DCI is used to activate a configuration resource configured on an inactive BWP, the configuration resource including the target resource.

In some possible implementations, the method further includes: activating, by the terminal device, the target resource.

In an eleventh aspect, there is provided a method for receiving data, the method is applied to an unlicensed frequency band, and the method includes: determining, by a network device, a target uplink Bandwidth Part (BWP) by Listen Before Talk (LBT); and receiving, by the network device, data using a target resource on the target uplink BWP.

In some possible implementations, before the receiving, by the network device, data using the target resource on the target uplink BWP, the method further includes: generating, by the network device, configuration information, the configuration information being used to configure the target resource for a terminal device; and sending, by the network device, the configuration information to the terminal device.

In some possible implementations, the sending, by the network device, the configuration information to the terminal device includes: sending, by the network device, a Radio Resource Control (RRC) signaling to the terminal device, the RRC signaling including the configuration information.

In some possible implementations, the method further includes: generating, by the network device, downlink control information (DCI), the DCI being used to activate the target resource; and sending, by the network device, the DCI to the terminal device.

In some possible implementations, the DCI is used to activate a configuration resource configured on an inactive BWP, the configuration resource including the target resource.

In a twelfth aspect, there is provided a terminal device, including: a functional module, configured to perform the methods in the foregoing first aspect or any possible implementations of the first aspect.

In a thirteenth aspect, there is provided a terminal device, and the terminal device includes: a processor, configured to call and run a computer program from a memory, the computer program being configured to perform the methods in the foregoing first aspect or any possible implementations of the first aspect.

In some possible implementations, the terminal device further includes: a memory, the memory being configured to store the computer program.

In a fourteenth aspect, there is provided a network device, including: a functional module, configured to perform the methods in the foregoing second aspect or any possible implementations of the second aspect.

In a fifteenth aspect, there is provided a network device, and the network device includes: a processor, configured to call and run a computer program from a memory, the computer program being used to perform the methods in the foregoing second aspect or any possible implementations of the second aspect.

In some possible implementations, the network device further includes: a memory, the memory being configured to store the computer program.

In a sixteenth aspect, there is provided a chip, including: a processor, configured to call and run a computer program from a memory, the computer program including: instructions being used to perform the methods in the foregoing first aspect or any possible implementations of the first aspect.

In a seventeenth aspect, there is provided a chip, including: a processor, configured to call and run a computer program from a memory, the computer program including: instructions being used to perform the methods in the foregoing second aspect or any possible implementations of the second aspect.

In an eighteenth aspect, there is provided a storage medium, and the storage medium is configured to store a computer program, and the computer program includes: instructions being used to perform the methods in the foregoing first aspect or any possible implementations of the first aspect.

In a nineteenth aspect, there is provided a storage medium, and the storage medium is configured to store a computer program, and the computer program includes: instructions being used to perform the methods in the foregoing second aspect or any possible implementations of the second aspect.

Based on the foregoing technical solutions, the terminal device determines a target uplink BWP by Listen Before Talk (LBT), and uses a target resource to transmit data on the target uplink BWP, which can implement data transmission on an unlicensed frequency band.

DETAILED DESCRIPTION

The technical solutions in the embodiments of the present application will be clearly and completely described below in conjunction with the drawings in the embodiments of the present application.

The technical solutions of the embodiments of the present application may be applied to a 5G NR communication system.

Figure 1:
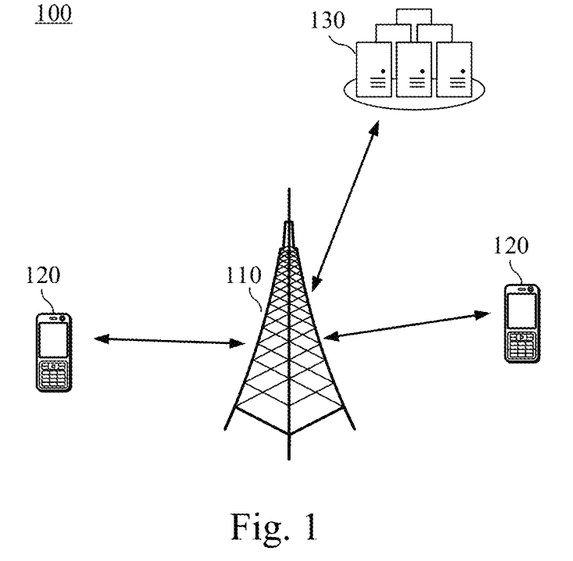
FIG. 1 is an example of an application scenario of an embodiment of the present application.

FIG. 1 shows a wireless communication system 100 applied in the embodiments of the present application. The wireless communication system 100 may include a base station 110 and at least one terminal device 120 located within a coverage area of the base station 110.

The base station 110 may be a device that communicates with the terminal device. The base station 110 may provide communication coverage for a specific geographic area, and may communicate with the terminal device (for example, UE) located within the coverage area. Optionally, the base station 110 may be a base station (gNB) in an NR system, or a wireless controller in a Cloud Radio Access Network (CRAN), or the network device may be a relay station, an access point, an In-vehicle device, a wearable device, or a network device in a future evolved Public Land Mobile Network (PLMN), etc.

The terminal device 120 may be mobile or fixed. Optionally, the terminal device 120 may refer to an access terminal, user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, an in-vehicle device, a wearable device, a terminal device in a future 5G network or a terminal device in a future evolved PLMN, etc.

The wireless communication system 100 also includes a core network device 130 that communicates with the base station. The core network device 130 may be a 5G core network (5G Core, 5GC) device, for example, an Access and Mobility Management Function (AMF), for another example, an Authentication Server Function (AUSF), and for still another example, a User Plane Function (UPF).

FIG. 1 exemplarily shows one base station, one core network device and two terminal devices. Optionally, the wireless communication system 100 may include a plurality of base station devices and other number of terminal devices may be within the coverage area of each base station, which is not limited in the embodiments of the present application.

Optionally, the wireless communication system 100 may also include other network entity such as an Session Management Function (SMF), a Unified Data Management (UDM), an Authentication Server Function (AUSF) or the like, which is not limited in the embodiments of the present application.

It should be understood that the terms "system" and "network" are often used interchangeably herein. The term "and/or" in the present application is only to describe a kind of association relationship among associated objects, and means that there may be three kinds of relationships. For example, A and/or B may mean that there are the following three cases: A exists alone, A and B exist at the same time, and B exists alone. In addition, the character "/" in the present application generally indicates that the associated objects are in an "or" relationship.

It should also be understood that the terminal device in the embodiments of the present application may access a licensed network and/or an unlicensed network by stand-alone (SA). In some embodiments of the present application, the terminal device accesses the licensed network through an access network device (gNB), and accesses the unlicensed network through a routing device. The terminal device may transfer part or all of the services to the licensed frequency band, or transfer part or all of the services to the unlicensed frequency band.

Figure 2:
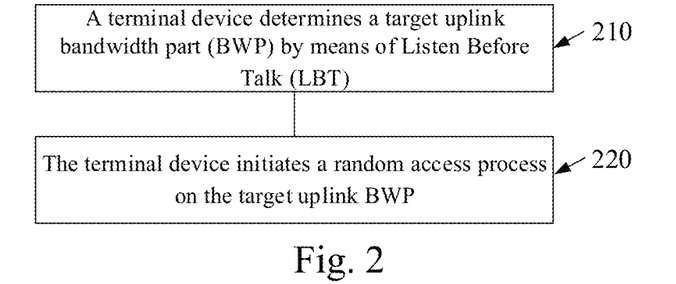
FIG. 2 is a schematic flowchart of a method for initiating a random access by a terminal device according to an embodiment of the present application.

FIG. 2 shows a schematic flowchart of a random access method 200 according to an embodiment of the present application, and the method 200 may be performed by a terminal device. The terminal device shown in FIG. 2 may be the terminal device shown in FIG. 1. The method 200 includes part or all of the following content.

In 210, the terminal device determines a target uplink BWP by LBT.

In 220, the terminal device initiates a random access procedure on the target uplink BWP.

It should be understood that the method in the embodiments of the present application is applicable to an unlicensed frequency band. To transmit data on the unlicensed spectrum, the terminal needs to meet the requirements of some unlicensed spectrum specifications, such as Listen before Talk (LBT), that is, the terminal or the network needs to listen to (sense) the channel before transmitting data. If the detected energy is lower than a certain threshold, it is considered that the terminal can transmit data on the channel.

In the embodiments of the present application, the terminal device determines a target uplink BWP by LBT, and initiates a random access procedure on the target uplink BWP, which can implement the random access on the unlicensed frequency band.

In some embodiments of the present application, the terminal device may be a terminal device in a connected state.

In some embodiments of the present application, the network device may configure the terminal device with at least one uplink BWP (Bandwidth Part) and at least one downlink BWP. For example, the network device may configure the terminal device with at most four uplink BWPs (Bandwidth Parts) and at most four downlink BWPs.

For example, the terminal device may be configured with four uplink BWPs with index of 0, 1, 2, and 3 respectively and four downlink BWPs with index of 0, 1, 2, and 3 respectively.

In some embodiments of the present application, there may be at most one activated downlink BWP and one activated uplink BWP at the same time.

In some embodiments of the present application, there may be no explicit association relationship between the uplink BWP and the downlink BWP of the terminal device, for example, the terminal device in the FDD system.

In some embodiments of the present application, the currently activated uplink BWP of the terminal device may be any uplink BWP configured by the network device. The currently activated downlink BWP of the terminal device may be any downlink BWP configured by the network device. For example, the currently activated uplink (UL) BWP index may be 0, and the currently activated downlink BWP index may be 1.

In some embodiments of the present application, the terminal device may initiate a random access procedure on the currently activated uplink BWP.

In some embodiments of the present application, the network device may indicate the terminal device to activate or deactivate an uplink BWP or a downlink BWP through a downlink control signaling (DCI).

In some embodiments of the present application, the currently activated downlink BWP may be switched to another BWP through the downlink control signaling (DCI). For example, the currently activated downlink (DL) BWP with index of 1 is switched to the DL BWP with index of 2, and the UL BWP may remain unchanged.

Optionally, in some embodiments of the present application, the terminal device initiates a contended random access procedure on the target uplink BWP.

In other words, the target uplink BWP is configured with a contended random access resource, and the terminal device may initiate a random access procedure on the contended random access resource configured by the network device.

In some embodiments of the present application, when the network device configures the contended random access resource, the network device may configure a common PRACH resource for any uplink BWP, so that the terminal initiates the random access on the currently activated uplink BWP.

Taking the terminal device configured with four uplink BWPs as an example, each of the four uplink BWPs may be configured with a common PRACH resource. If the currently activated uplink BWP is configured with the common PRACH resource, the terminal device may initiate random access on the currently activated uplink BWP when initiating a contended random access procedure.

In the embodiments of the present application, for a Random Access Channel (Physical Random Access Channel, RACH) on the unlicensed frequency band (licensed band), because a plurality of User Equipments (UEs) are configured with a common Physical Random Access Channel (PRACH) resource, different UE may perform a contended random access on the same PRACH resource, which results in random access conflicts.

In some embodiments of the present application, when the terminal devices conflict, the network device may send a back off indication (BI) value in the random access response (RAR) of message 2 (msg2), so that the terminal device in which the conflict occurs may generate a back off random number based on the BI value, and then, when the next PRACH resource arrives, msg1 is sent according to a time delay of the back off random number, which reduces the probability of sending conflict to a certain extent.

In some embodiments of the present application, after initiating the random access, the terminal device may receive a RAR in the currently activated downlink BWP.

In the embodiments of the present application, when there is no correspondence between the uplink BWP and the downlink BWP, if the terminal device initiates a contended random access in the currently activated uplink BWP (provided that this uplink BWP is configured with a common PRACH resource), because the network device does not know which UE initiated the contended random access, the network device does not know which uplink BWP in the frequency domain position the received msg1 corresponds to.

In this case, when the network device sends a random access response (RAR), the network device may first determine which UEs in the frequency domain position of msg1 are configured with the uplink BWP, and then determine the currently activated downlink BWPs of these UEs, and then send the RARs on all the activated downlink BWP, so as to ensure that the UE can receive the RAR.

However, the adoption of the foregoing technical solution will lead to that the network device sends too many RARs, which will result in the decrease of resource utilization.

Optionally, in some embodiments of the present application, the terminal device switches the currently activated downlink BWP to a downlink BWP with the same index as the target uplink BWP.

Therefore, the network device can first determine which UEs in the frequency domain of msg1 are configured with the uplink BWP, then determine the currently activated downlink BWPs of these UEs, and then only need to send the RARs on the downlink BWPs with the same index as the target uplink BWP. It is avoided that the RARs are sent on all the downlink BWPs, which effectively saves the resource utilization.

The following describes a specific implementation of determining the target BWP by the terminal device when the terminal device initiates a contended random access procedure on the target uplink BWP.

Optionally, in some embodiments of the present application, when the terminal device performs LBT on the currently activated first uplink BWP and succeeds, it determines the first uplink BWP as the target BWP, where the first BWP is configured with a contention-based random access resource, and/or the first BWP is configured with a non-contention based random access resource. In the embodiments of the present application, the non-contention based random access resource is a Dedicated PRACH resource of the terminal device, which is used for a non-contention based random access procedure, while the contention-based random access resource is a Common PRACH resource, which is used for a contention-based random access procedure.

When performing random access on the unlicensed frequency band, the terminal initiates random access on the currently activated Bandwidth Part (BWP) (if the currently activated target uplink BWP is configured with a random access resource), then the terminal needs to perform LBT first, and if LBT succeeds, the terminal can initiate random access on the currently activated BWP, however, if the currently activated target uplink BWP channel is always busy (for example, occupied by other system), the random access procedure fails.

Therefore, the embodiments of the present application provide a new mechanism to ensure the success probability of random access.

Optionally, in some embodiments of the present application, when the terminal device performs LBT on the currently activated first uplink BWP and fails, it switches the currently activated uplink BWP from the first uplink BWP to a second uplink BWP, where the second BWP is an uplink BWP configured by a network device; and the terminal device determines the second BWP as the target BWP when it performs LBT on the second BWP and succeeds.

Optionally, in some embodiments of the present application, the second uplink BWP is configured with a contended random access resource.

Optionally, in some embodiments of the present application, when the terminal device performs LBT on the currently activated first uplink BWP and a number of failures is greater than or equal to a first threshold, the currently activated uplink BWP is switched from the first uplink BWP to the second uplink BWP.

Optionally, in some embodiments of the present application, the first threshold value is a preset threshold value, or the first threshold value is a threshold value configured by the network device.

Optionally, in some embodiments of the present application, when the terminal device fails to perform LBT on the currently activated first uplink BWP and a back off time is greater than or equal to a second threshold, the currently activated uplink BWP is switched from the first uplink BWP to the second uplink BWP.

Optionally, in some embodiments of the present application, the second threshold value is a preset threshold value, or the second threshold value is a threshold value configured by the network device.

Optionally, in some embodiments of the present application, the terminal device performs LBT on at least one uplink BWP configured by the network device, where the at least one uplink BWP includes the currently activated first uplink BWP; and the terminal device determines the target uplink BWP in the uplink BWP on which the LBT is successfully performed.

Optionally, in some embodiments of the present application, each uplink BWP in the at least one uplink BWP is configured with a contended random access resource.

Optionally, in some embodiments of the present application, when the terminal device determines that the uplink BWP on which LBT is successfully performed includes the first uplink BWP, the terminal device determines the first uplink BWP as the target uplink BWP.

Optionally, in some embodiments of the present application, when the terminal device determines that the first uplink BWP on which LBT is successfully performed does not include the first uplink BWP, one uplink BWP is randomly selected and determined as the target BWP from the uplink BWP on which the LBT is successfully performed.

Optionally, in some embodiments of the present application, when the terminal device determines that it fails to performing LBT on at least one uplink BWP, it continues to perform LBT on the at least one uplink BWP until the at least one uplink BWP includes an uplink BWP on which LBT is successfully performed.

Optionally, in some embodiments of the present application, the terminal device initiates a contended based random access procedure on the target uplink BWP.

The following describes an implementation of initiating a non-contended random access procedure by the terminal device on the target uplink BWP.

Optionally, in some embodiments of the present application, the terminal device receives indication information sent by the network device, the indication information is used to indicate a PRACH resource used when the terminal device initiates a non-contended random access procedure; and when the terminal device successfully performs LBT on the uplink BWP where the PRACH resource is located, the uplink BWP where the PRACH resource is located is determined as the target uplink BWP.

Optionally, in some embodiments of the present application, the terminal device receives a Physical Downlink Control Channel (PDCCH) signaling sent by the network device, where the PDCCH signaling includes the indication information.

Optionally, in some embodiments of the present application, the terminal device receives a Radio Resource Control (RRC) signaling sent by the network device, where the RRC signaling includes the indication information.

Optionally, in some embodiments of the present application, the terminal device receives a Media Access Control (MAC) control element (CE) sent by the network device, where the MAC CE includes the indication information.

The preferred embodiments of the present application are described in detail above with reference to the accompanying drawings. However, the present application is not limited to the specific details in the foregoing embodiments. Within the scope of the technical concept of the present application, various simple modifications can be made to the technical solutions of the present application, and these simple variants all belong to the protection scope of the present application.

For example, the various specific technical features described in the foregoing specific embodiments can be combined in any suitable manner if there is no contradiction. In order to avoid unnecessary repetition, the present application does not explain various possible combinations separately.

For another example, various different embodiments of the present application can also be combined arbitrarily, as long as it does not violate the idea of the present application, and such combination should also be regarded as the contents disclosed in the present application.

It should be understood that, in the various method embodiments of the present application, the size of the sequence number of each process mentioned above does not mean the order of execution. The execution order of each process should be determined by its function and internal logic, and should not constitute any limitation on the implementation process of the embodiments of the present application.

Figure 3:
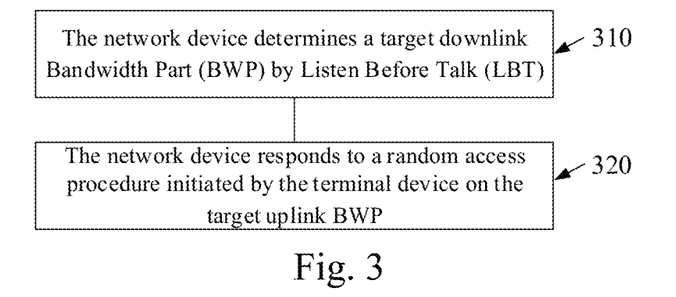
FIG. 3 is a schematic flowchart of a method for responding to a random access of a terminal device by a network device according to an embodiment of the present application.

The random access method according to the embodiment of the present application is described in detail above with reference to FIG. 2 from the perspective of the terminal device. A random access method according to an embodiment of the present application will be described below in conjunction with FIG. 3 from the perspective of a network device responding to the terminal device. FIG. 3 shows a schematic flowchart of a random access method 300 according to an embodiment of the present application. The method 300 may be performed by the network device as shown in FIG. 1. As shown in FIG. 3, the method 300 includes the following steps.

In 310, the network device determines a target downlink Bandwidth Part (BWP) by Listen Before Talk (LBT).

In 320, the network device responds to a random access procedure initiated by the terminal device on the target downlink BWP.

Optionally, in some embodiments of the present application, the network device determines a downlink BWP with a same index as the target uplink BWP as the target downlink BWP, where the target uplink BWP is the uplink BWP used by the terminal device to initiate a random access procedure.

Optionally, in some embodiments of the present application, the network device responds to a contended random access procedure initiated by the terminal device on the target downlink BWP.

Optionally, in some embodiments of the present application, the network device responds to a non-contended random access procedure initiated by the terminal device on the target downlink BWP.

Optionally, in some embodiments of the present application, before the network device determines a target downlink Bandwidth Part (BWP) by Listen Before Talk (LBT), the network device sends indication information to the terminal device, where the indication information is used to indicate the PRACH resource used when the terminal device initiates a non-contended random access procedure; where the target uplink BWP is the uplink BWP where the PRACH resource is located.

Optionally, in some embodiments of the present application, the network device sends a Physical Downlink Control Channel (PDCCH) signaling to the terminal device, where the PDCCH signaling includes the indication information.

Optionally, in some embodiments of the present application, the network device sends a Radio Resource Control (RRC) signaling to the terminal device, where the RRC signaling includes the indication information.

Optionally, in some embodiments of the present application, the network device sends a Media Access Control (MAC) Control Element (CE) to the terminal device, where the MAC CE includes the indication information.

It should be understood that the steps in the method 300 for the network device to respond to random access of the terminal device may refer to the corresponding steps in the method 200 for random access initiated by the terminal device. For brevity, details are not described herein again.

The method embodiments of the present application are described in detail above with reference to FIGS. 2 to 3, and the apparatus embodiments of the present application are described in detail below in conjunction with FIGS. 4 to 7.

Figure 4:
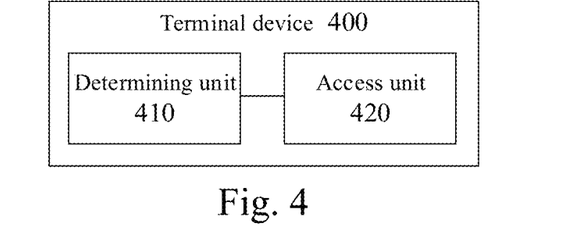
FIG. 4 is a schematic block diagram of a terminal device according to an embodiment of the present application.

FIG. 4 is a schematic block diagram of a terminal device 400 according to an embodiment of the present application, and the terminal device is applied to an unlicensed frequency band. Specifically, as shown in FIG. 4, the terminal device 400 may include:

a determining unit 410, configured to determine a target uplink Bandwidth Part (BWP) by Listen Before Talk (LBT); and an access unit 420, configured to initiate a random access procedure on the target uplink BWP.

Optionally, in some embodiments of the present application, the terminal device further includes:

a switching unit, configured to switch a currently activated downlink BWP to a downlink BWP with a same index as the target uplink BWP.

Optionally, in some embodiments of the present application, the determining unit 410 is specifically configured to:

when the performing of LBT on the currently activated first uplink BWP succeeds, determine the first uplink BWP as the target BWP, where the first BWP is configured with a contention-based random access resource, and/or the first BWP is configured with a non-contention based random access resource.

Optionally, in some embodiments of the present application, the access unit 420 is specifically configured to:

initiate a contention-based random access procedure on the target uplink BWP.

Optionally, in some embodiments of the present application, the determining unit 410 is more specifically configured to:

when the performing of LBT on the currently activated first uplink BWP fails, switch the currently activated uplink BWP from the first uplink BWP to a second uplink BWP, where the second BWP is an uplink BWP configured by a network device; and when the performing of LBT on the second BWP succeeds, determine the second BWP as the target BWP.

Optionally, in some embodiments of the present application, the second uplink BWP is configured with a contention-based random access resource.

Optionally, in some embodiments of the present application, the determining unit 410 is more specifically configured to:

when the performing of LBT on the currently activated first uplink BWP fails, and a number of failures is greater than or equal to a first threshold value, switch the currently activated uplink BWP from the first uplink BWP to the second uplink BWP.

Optionally, in some embodiments of the present application, the first threshold value is a preset threshold value, or the first threshold value is a threshold value configured by the network device.

Optionally, in some embodiments of the present application, the determining unit 410 is more specifically configured to:

when the performing of LBT on the currently activated first uplink BWP fails, and a back off duration is greater than or equal to a second threshold value, switch the currently activated uplink BWP from the first uplink BWP to a second uplink BWP.

Optionally, in some embodiments of the present application, the second threshold value is a preset threshold value, or the second threshold value is a threshold value configured by the network device.

Optionally, in some embodiments of the present application, the determining unit 410 is more specifically configured to:

perform LBT on at least one uplink BWP configured by the network device, the at least one uplink BWP including the currently activated first uplink BWP; and determine the target uplink BWP in the uplink BWP on which LBT is successfully performed.

Optionally, in some embodiments of the present application, each uplink BWP in the at least one uplink BWP is configured with a contention-based random access resource.

Optionally, in some embodiments of the present application, the determining unit 410 is more specifically configured to:

when determining that the uplink BWP on which LBT is successfully performed includes the first uplink BWP, determine the first uplink BWP as the target uplink BWP.

Optionally, in some embodiments of the present application, the determining unit 410 is more specifically configured to:

when determining that the uplink BWP on which LBT is successfully performed does not include the first uplink BWP, randomly select and determine one uplink BWP from the uplink BWP on which LBT is successfully performed as the target BWP.

Optionally, in some embodiments of the present application, the determining unit 410 is further configured to:

when determining that all the performing of LBT on the at least one uplink BWP fail, continue to perform LBT on the at least one uplink BWP until the at least one uplink BWP includes the uplink BWP on which LBT is successfully performed.

Optionally, in some embodiments of the present application, the access unit 420 is specifically configured to:

initiate a non-contention based random access procedure on the target uplink BWP.

Optionally, in some embodiments of the present application, the terminal device further includes:

a transceiver unit, before the determining unit 410 determines a target uplink Bandwidth Part (BWP) by Listen Before Talk (LBT), the transceiver unit is used to receive indication information sent by the network device, where the indication information is used to indicate the PRACH resource used when the terminal device initiates a non-contention based random access procedure; and the determining unit 410 is specifically configured to:

when the performing of LBT on an uplink BWP where the PRACH resource is located succeeds, determine the uplink BWP where the PRACH resource is located as the target uplink BWP.

Optionally, in some embodiments of the present application, the transceiver unit is specifically configured to:

receive a Physical Downlink Control Channel (PDCCH) signaling sent by the network device, the PDCCH signaling including the indication information.

Optionally, in some embodiments of the present application, the transceiver unit is specifically configured to:

receive a Radio Resource Control (RRC) signaling sent by the network device, the RRC signaling including the indication information.

Optionally, in some embodiments of the present application, the transceiver unit is specifically configured to:

receive a Media Access Control (MAC) Control Element (CE) sent by the network device, the MAC CE including the indication information.

It should be understood that the device embodiments and the method embodiments may correspond to each other, and similar descriptions may refer to the method embodiments. Specifically, a terminal device 400 shown in FIG. 4 may correspond to a corresponding subject in the method 200 that performs the embodiments of the present application, and the foregoing and other operations and/or functions of each unit in the terminal device 400 are to implement the corresponding process in each method of FIG. 1 respectively. For brevity, details are not described herein again.

Figure 5:
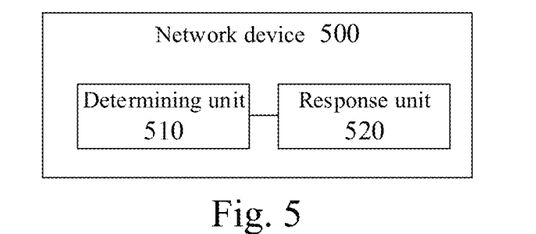
FIG. 5 is a schematic block diagram of a network device according to an embodiment of the present application.

FIG. 5 is a schematic block diagram of a network device according to an embodiment of the present application. Optionally, the network device is applied to an unlicensed frequency band. Specifically, as shown in FIG. 5, the network device 500 may include:

a determining unit 510, configured to determine a target uplink Bandwidth Part (BWP) by Listen Before Talk (LBT); and a response unit 520, configured to respond to a random access procedure initiated by the terminal device on the target downlink BWP.

Optionally, in some embodiments of the present application, the determining unit 510 is specifically configured to:

determine a downlink BWP with a same index as a target uplink BWP as the target downlink BWP, where the target uplink BWP is an uplink BWP used when the terminal device initiates a random access procedure.

Optionally, in some embodiments of the present application, the response unit 520 is specifically configured to:

respond to a contention-based random access procedure initiated by the terminal device on the target downlink BWP.

Optionally, in some embodiments of the present application, the response unit 520 is specifically configured to:

respond to a non-contention based random access procedure initiated by the terminal device on the target downlink BWP.

Optionally, in some embodiments of the present application, the network device further includes:

a transceiver unit, before the determining unit 510 determines a target downlink Bandwidth Part (BWP) by Listen Before Talk (LBT), the transceiver unit is used to send indication information to the terminal device, where the indication information is used to indicate a PRACH resource used when the terminal device initiates a non-contention based random access procedure;

where the target uplink BWP is an uplink BWP where the PRACH resource is located.

Optionally, in some embodiments of the present application, the transceiver unit is specifically configured to:

send a Physical Downlink Control Channel (PDCCH) signaling to the terminal device, the PDCCH signaling including the indication information.

Optionally, in some embodiments of the present application, the transceiver unit is specifically configured to:

send a Radio Resource Control (RRC) signaling to the terminal device, the RRC signaling including the indication information.

Optionally, in some embodiments of the present application, the transceiver unit is specifically configured to:

send a Media Access Control (MAC) Control Element (CE) to the terminal device, the MAC CE including the indication information.

It should be understood that the device embodiments and the method embodiments may correspond to each other, and similar descriptions may refer to the method embodiments. Specifically, the network device 500 shown in FIG. 5 may correspond to a corresponding subject in the method 300 that performs the embodiments of the present application, and the foregoing and other operations and/or functions of each unit in the network device 500 are to implement the corresponding process in each method of FIG. 3 respectively. For brevity, details are not described herein again.

The communication device of the embodiments of the present application is described above from the perspective of functional modules in conjunction with FIG. 4 and FIG. 5. It should be understood that the functional module can be implemented in the form of hardware, and can also be implemented by instructions in the form of software, or can be implemented by a combination of hardware and software modules.

Specifically, the steps of the method embodiments in the embodiments of the present application can be completed by an integrated logic circuit of the hardware in the processor and/or the instructions in the form of software. The steps of the method disclosed in the embodiments of the present application can be directly embodied as performed and completed by the hardware decoding processor, or performed and completed by the combination of the hardware and software modules in the decoding processor.

Optionally, the software module may be located in a mature storage medium in the art, such as a random access memory, a flash memory, a read-only memory, a programmable read-only memory, an electrically erasable programmable memory, or a register, etc. The storage medium is located in the memory, and the processor reads information in the memory, and completes the steps in the foregoing method embodiments in combination with its hardware.

For example, in the embodiments of the present application, the determining unit 410 shown in FIG. 4 and the determining unit 510 shown in FIG. 5 may be implemented by a processor, and the access unit 420 shown in FIG. 4 and the response unit 320 shown in FIG. 5 may be implemented by a transceiver.

Figure 6:
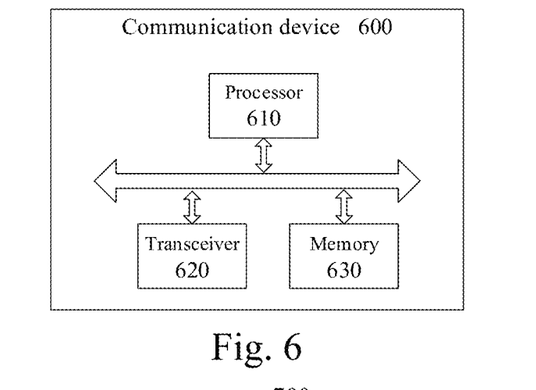
FIG. 6 is a schematic block diagram of a communication device according to an embodiment of the present application.

FIG. 6 is a schematic structural diagram of a communication device 600 according to an embodiment of the present application. The communication device 600 shown in FIG. 6 includes a processor 610, and the processor 610 can call and run a computer program from a memory to implement the methods in the embodiments of the present application.

Optionally, as shown in FIG. 6, the communication device 600 may further include a memory 620. The memory 620 may be used to store indication information, and may also be used to store codes, instructions or the like performed by the processor 610. The processor 610 may call and run a computer program from the memory 620 to implement the methods in the embodiments of the present application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices, specifically, may send information or data to other devices, or may receive information or data sent by other devices.

The transceiver 630 may include a transmitter and a receiver. The transceiver 630 may further include an antenna, and the number of antennas may be one or more.

Optionally, the communication device 600 may be a network device in an embodiment of the present application, and the communication device 600 may implement corresponding process implemented by the network device in each method in the embodiments of the present application. That is, the communication device 600 in the embodiments of the present application may correspond to the network device 500 in the embodiments of the present application, and may correspond to a corresponding subject performing the method 300 according to the embodiments of the present application. For brevity, details are not described herein again.

Optionally, the communication device 600 may be a terminal device of an embodiment of the present application, and the communication device 600 may implement the corresponding process implemented by the terminal device in each method of the embodiments of the present application. That is, the communication device 600 may correspond to the terminal device 400 in the embodiments of the present application, and may correspond to a corresponding subject performing the method 300 according to the embodiments of the present application. For brevity, details are not described herein again.

It should be understood that individual components in the communication device 600 are connected by a bus system, where the bus system includes a power bus, a control bus, and a status signal bus in addition to a data bus.

An embodiment of the present application also provides a method for transmitting data, the method is applied to an unlicensed frequency band, and the method includes: determining, by a terminal device, a target uplink Bandwidth Part (BWP) by Listen Before Talk (LBT); and transmitting, by the terminal device using a target resource, data on the target uplink BWP.

Optionally, in some embodiments of the present application, before the transmitting, by the terminal device using a target resource, data on the target uplink BWP, the terminal device receives configuration information sent by a network device, and the configuration information is used to configure the target resource for the terminal device.

Optionally, in some embodiments of the present application, the terminal device receives a Radio Resource Control (RRC) signaling sent by a network device, the RRC signaling including the configuration information.

Optionally, in some embodiments of the present application, the method further includes: receiving, by the terminal device, downlink control information (DCI) sent by a network device, the DCI being used to activate the target resource Optionally, in some embodiments of the present application, the DCI is used to activate a configuration resource configured on an inactive BWP, the configuration resource including the target resource.

For example, assuming that the terminal device is configured with two uplink BWPs, such as BWP1 and BWP2, the currently activated BWP is BWP1, and both BWP1 and BWP2 are configured with uplink semi-static resources, at this time, the terminal device receives one DCI on the currently activated downlink BWP, and the DCI may be used to activate the semi-static configuration resource on BWP1, and may also be used to activate the semi-static configuration resource on BWP2 (even if BWP2 is in the inactive state). Therefore, when the terminal device performs BWP switching, that is, when switching from BWP1 to BWP2, the terminal device may directly use the semi-static configuration resource on BWP2 without waiting for the DCI to activate the resource on it for use.

Optionally, in some embodiments of the present application, the method further includes: activating, by the terminal device, the target resource.

An embodiment of the present application also provides a method for receiving data, the method is applied to an unlicensed frequency band, and the method includes: determining, by a network device, a target uplink Bandwidth Part (BWP) by Listen Before Talk (LBT); and receiving, by the network device using a target resource, data on the target uplink BWP.

Optionally, in some embodiments of the present application, before the receiving, by the network device using a target resource, data on the target uplink BWP, the network device generates configuration information, and the configuration information is used to configure the target resource for a terminal device; and the network device sends the configuration information to the terminal device.

Optionally, in some embodiments of the present application, the network device sends a Radio Resource Control (RRC) signaling to the terminal device, the RRC signaling including the configuration information.

Optionally, in some embodiments of the present application, the method further includes: generating, by the network device, downlink control information (DCI), the DCI being used to activate the target resource; and sending, by the network device, the DCI to the terminal device.

Optionally, in some embodiments of the present application, the DCI is used to activate a configuration resource configured on an inactive BWP, the configuration resource including the target resource.

An embodiment of the present application also provides a terminal device, the terminal device is applied to an unlicensed frequency band, and the terminal device includes: a determining unit, configured to determine a target uplink Bandwidth Part (BWP) by Listen Before Talk (LBT); and a communication unit, configured to use a target resource to transmit data on the target uplink BWP.

Optionally, in some embodiments of the present application, before the communication unit uses a target resource to transmit data on the target uplink BWP, the communication unit is further configured to: receive configuration information sent by a network device, the configuration information being used to configure the target resource for the terminal device.

Optionally, in some embodiments of the present application, the communication unit is specifically configured to: receive a Radio Resource Control (RRC) signaling sent by the network device, the RRC signaling including the configuration information.

Optionally, in some embodiments of the present application, the communication unit is further configured to: receive downlink control information (DCI) sent by the network device, the DCI being used to activate the target resource.

Optionally, in some embodiments of the present application, the DCI is used to activate a configuration resource configured on an inactive BWP, the configuration resource including the target resource.

Optionally, in some embodiments of the present application, the communication unit is further configured to: activate the target resource.

An embodiment of the present application also provides a network device, the network device is applied to an unlicensed frequency band, and the network device includes: a determining unit, configured to determine a target uplink Bandwidth Part (BWP) by Listen Before Talk (LBT); and a communication unit, configured to use a target resource to receive data on the target uplink BWP.

Optionally, in some embodiments of the present application, before the communication unit uses a target resource to receive data on the target uplink BWP, the communication unit is further configured to: generate configuration information, the configuration information being used to configure the target resource for a terminal device; and send the configuration information to the terminal device.

Optionally, in some embodiments of the present application, the communication unit is specifically configured to: send a Radio Resource Control (RRC) signaling to the terminal device, the RRC signaling including the configuration information.

Optionally, in some embodiments of the present application, the communication unit is further configured to: send downlink control information (DCI) to the terminal device, the DCI being used to activate the target resource.

Optionally, in some embodiments of the present application, the DCI is used to activate a configuration resource configured on an inactive BWP, the configuration resource including the target resource.

It should be understood that the foregoing determining unit may be implemented by a processor, and the communication unit may be implemented by a transceiver, which are not specifically limited by the embodiments of the present application.

In addition, an embodiment of the present application also provides a chip, the chip may be an integrated circuit chip with signal processing capability, and may implement or perform the methods, steps, and logical block diagrams disclosed in the embodiments of the present application.

Optionally, the chip can be applied to various communication devices to enable the communication device installed with the chip to perform the methods, steps, and logical block diagrams disclosed in the embodiments of the present application.

Figure 7:
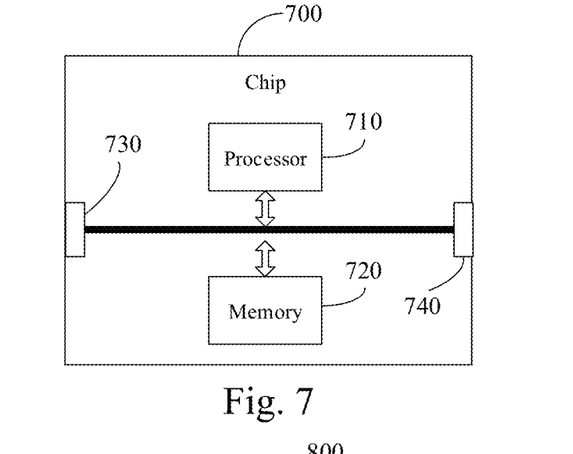
FIG. 7 is a schematic block diagram of a chip according to an embodiment of the present application.

FIG. 7 is a schematic structural diagram of a chip according to an embodiment of the present application. The chip 700 shown in FIG. 7 includes a processor 710, and the processor 710 can call and run a computer program from a memory to implement the method in the embodiments of the present application.

Optionally, as shown in FIG. 7, the chip 700 may further include a memory 720. The processor 710 may call and run a computer program from the memory 720 to implement the method in the embodiments of the present application. The memory 720 may be used to store indication information, and may also be used to store codes, instructions or the like performed by the processor 710. The memory 720 may be a separate device independent of the processor 710, or may be integrated in the processor 710.

Optionally, the chip 700 may further include an input interface 730. The processor 710 may control the input interface 730 to communicate with other devices or chips, specifically, may obtain information or data sent by other devices or chips.

Optionally, the chip 700 may further include an output interface 740. The processor 710 may control the output interface 740 to communicate with other devices or chips, specifically, may output information or data to other devices or chips.

Optionally, the chip can be applied to the network device in the embodiments of the present application, and the chip can implement the corresponding process implemented by the network device in each method of the embodiments of the present application. For brevity, details are not described herein again.

Optionally, the chip can be applied to the terminal device in the embodiments of the present application, and the chip can implement the corresponding process implemented by the terminal device in each method of the embodiments of the present application. For brevity, details are not described herein again.

It should be understood that the chip mentioned in the embodiments of the present application may also be referred to as a system-level chip, a system chip, a chip system, or a system-on-chip chip, etc. It should also be understood that individual components in the chip 700 are connected by a bus system, where the bus system includes a power bus, a control bus, and a status signal bus in addition to the data bus.

The processor mentioned in the embodiments of the present application may be a general-purpose processor, a Digital Signal Processor (DSP), an Application Specific Integrated Circuit (ASIC), a Field Programmable Gate Array (FPGA) or other programmable logic devices, transistor logic devices, discrete hardware components or the like. In addition, the general-purpose processor may be a microprocessor, or the processor may also be any conventional processor or the like.

In addition, the memory mentioned in the embodiments of the present application may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) that acts as an external cache.

It should be understood that the foregoing memory is exemplary but not restrictive, for example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), or a Direct Rambus (DR RAM), etc.

An embodiment of the present application also provides a computer-readable storage medium for storing a computer program.

Optionally, the computer-readable storage medium may be applied to the network device in the embodiments of the present application, and the computer program enables the computer to perform the corresponding process implemented by the network device in each method of the embodiments of the present application. For brevity, details are not described herein again.

Optionally, the computer-readable storage medium can be applied to the mobile terminal/terminal device in the embodiments of the present application, and the computer program enables the computer to perform the corresponding process implemented by the mobile terminal/terminal device in each method of the embodiments of the present application. For brevity, details are not described herein again.

An embodiment of the present application also provides a computer program product, including computer program instructions.

Optionally, the computer program product may be applied to the network device in the embodiments of the present application, and the computer program instructions enable the computer to perform the corresponding process implemented by the network device in each method of the embodiments of the present application. For brevity, details are not described herein again.

Optionally, the computer program product can be applied to the mobile terminal/terminal device in the embodiments of the present application, and the computer program instructions enable the computer to perform the corresponding process implemented by the mobile terminal/terminal device in each method of the embodiments of the present application. For brevity, details are not described herein again.

An embodiment of the present application also provides a computer program.

Optionally, the computer program may be applied to the network device in the embodiments of the present application. When the computer program runs on the computer, the computer is enabled to perform the corresponding process implemented by the network device in each method of the embodiments of the present application. For brevity, details are not described herein again.

Figure 8:
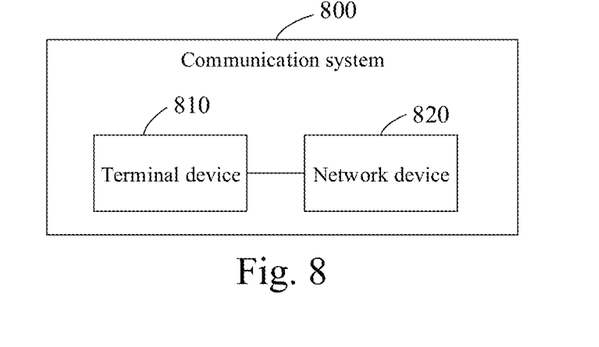
FIG. 8 is a schematic block diagram of a communication system according to an embodiment of the present application.

FIG. 8 is a schematic block diagram of a communication system 800 according to an embodiment of the present application. As shown in FIG. 8, the communication system 800 includes a terminal device 810 and a network device 820. The terminal device 810 is used to determine a target uplink Bandwidth Part (BWP) by Listen Before Talk (LBT); and initiate a random access procedure on the target uplink BWP. The network device 820 is used to determine a target downlink Bandwidth Part (BWP) by Listen Before Talk (LBT); and respond to a random access procedure initiated by the terminal device on the target uplink BWP.

The terminal device 810 may be used to implement the corresponding functions implemented by the terminal device in the foregoing methods 200 to 300, and the constitution of the terminal device 810 may be as shown in the terminal device 400 in FIG. 4. For brevity, details are not described herein again.

The network device 820 may be used to implement the corresponding functions implemented by the network device in the foregoing methods 200 to 300, and the constitution of the network device 820 may be as shown in the network device 500 in FIG. 5. For brevity, details are not described herein again.

It should be noted that the term "system" in the present disclosure can also be referred to as "network management architecture" or "network system" or the like.

It should also be understood that the terminologies used in the embodiments of the present application and the appended claims are for the purpose of describing particular embodiments only, and are not intended to limit the embodiments of the present application.

For example, the singular forms of "a", "an", "the", and "said" used in the embodiments of the present application and the appended claims are intended to include the plural forms as well, unless the context clearly indicates otherwise.

Those of ordinary skills in the art may be aware that, the units and algorithm steps of the various examples described in combination with the embodiments disclosed herein may be implemented by electronic hardware or a combination of computer software and electronic hardware. Whether these functions are performed by hardware or software depends on particular applications and design constraint conditions of the technical solution. Those of ordinary skills in the art may use different methods to implement the described functions for each particular application, but it should not be considered that such implementation goes beyond the scope of the embodiments of the present application.

The functions may also be stored in a computer-readable storage medium if being implemented in the form of a software functional unit and sold or used as an independent product. Based on such understanding, the essence of the technical solutions of the embodiments of the present application or the part contributing to the prior art, or a part of the technical solutions may be embodied in the form of a software product. The computer software product is stored in a storage medium including several instructions such that a computer device (which may be a personal computer, a server, or a network device, etc.) performs part or all of the steps of the method described in each of the embodiments of the present application. The aforementioned storage media includes: a U disk, a mobile hard disk, a Read-Only Memory (ROM), a Random Access Memory (RAM), a magnetic disk, or an optical disk and other media that can store program codes.

It may be clearly understood by those of ordinary skills in the art that for the purpose of convenience and conciseness description, the detailed working process of the foregoing systems, the apparatuses, and the units, reference may be made to the corresponding process in the foregoing method embodiments, which are not described herein again.

In the several embodiments provided by the present application, it should be understood that the disclosed systems, apparatuses, and methods may be implemented in other manners.

For example, the division of units or modules or components in the foregoing apparatus embodiments is only one kind of logical function division. In actual implementations, there may be another division manner, for example, multiple units or modules or components can be combined or integrated into another system, or some units or modules or components can be ignored or not performed.

For another example, the units/modules/components described as separated/displayed parts may or may not be physically separated, that is, may be located in one place, or may be distributed on multiple network units. Some or all of the units/modules/components may be selected according to actual needs to achieve the objectives of the embodiments of the present application.

Finally, it should be noted that the mutual coupling or direct coupling or communication connection shown or discussed above may be indirect coupling or communication connection through some interfaces, devices or units, and may be in electrical, mechanical or other forms.

The foregoing descriptions are merely specific implementations of the embodiments of the present application, and the protection scope of the embodiments of the present application is not limited thereto. Any person skilled in the art can easily think of changes or substitutions within the technical scope disclosed in the embodiments of the present application, and all the changes or substitutions should be covered by the protection scope of the embodiments of the present application. Therefore, the protection scope of the embodiments of the present application should be subjected to the protection scope of the claims.

What is claimed is:

1. A random access method, wherein the method is applied to an unlicensed frequency band, the method comprises:
    determining, by a terminal device, a target uplink Bandwidth Part (BWP) by Listen Before Talk (LBT); and
    initiating, by the terminal device, a random access procedure on the target uplink BWP;
    wherein the initiating, by the terminal device, the random access procedure on the target uplink BWP comprises:
        initiating, by the terminal device, a contention-based random access procedure on the target uplink BWP;
        in response to that the terminal device performs LBT on a first uplink BWP and fails, switching a currently activated uplink BWP from the first uplink BWP to a second uplink BWP, wherein the second uplink BWP is an uplink BWP configured by a network device; and
        in response to the terminal device performs LBT on the second uplink BWP and succeeds, determining the second uplink BWP as the target uplink BWP;
    wherein in response to that the terminal device performs LBT on the first uplink BWP and fails, switching the currently activated uplink BWP from the first uplink BWP to the second uplink BWP, comprises:
        in response to that the terminal device performs LBT on the first uplink BWP and a number of failures is greater than or equal to a first threshold value, switching the currently activated uplink BWP from the first uplink BWP to the second uplink BWP.

2. The method according to claim 1, further comprising:
    switching, by the terminal device, a currently activated downlink BWP to a downlink BWP with a same index as the target uplink BWP.

3. The method according to claim 1, wherein the determining, by the terminal device, the target uplink Bandwidth Part (BWP) by Listen Before Talk (LBT) comprises:
    in response to that the terminal device performs LBT on the first uplink BWP and succeeds, determining the first uplink BWP as the target uplink BWP, wherein the first uplink BWP is configured with a contention-based random access resource.

4. The method according to claim 1, wherein the second uplink BWP is configured with a contention-based random access resource.

5. The method according to claim 1, wherein the first threshold value is a preset threshold value, or the first threshold value is a threshold value configured by the network device.

6. A terminal device, comprising: a processor, configured to call and run a computer program from a memory, the computer program comprises instructions to:
    determine a target uplink Bandwidth Part (BWP) by Listen Before Talk (LBT); and
    initiate a random access procedure on the target uplink BWP,
    wherein the processor is further configured to:
        initiate a contention-based random access procedure on the target uplink BWP;
    wherein the processor is further configured to:
        in response to that performing of LBT on a first uplink BWP fails, switch a currently activated uplink BWP from the first uplink BWP to a second uplink BWP, wherein the second uplink BWP is an uplink BWP configured by a network device; and
        in response to that performing of LBT on the second uplink BWP succeeds, determine the second uplink BWP as the target BWP;

wherein the processor is further configured to:
in response to that the performing of LBT on the first uplink BWP fails, and a number of failures is greater than or equal to a first threshold value, switch the currently activated uplink BWP from the first uplink BWP to the second uplink BWP.

7. The terminal device according to claim 6, wherein the processor is further configured to:
switch a currently activated downlink BWP to a downlink BWP with a same index as the target uplink BWP.

8. The terminal device according to claim 6, wherein the processor is further configured to:
in response to that the performing of LBT on the first uplink BWP succeeds, determine the first uplink BWP as the target BWP, wherein the first uplink BWP is configured with a contention-based random access resource.

9. The terminal device according to claim 6, wherein the second uplink BWP is configured with a contention-based random access resource.

10. The terminal device according to claim 6, wherein the first threshold value is a preset threshold value, or the first threshold value is a threshold value configured by the network device.

11. A random access method, wherein the method is applied to an unlicensed frequency band, the method comprises:
determining, by a network device, a target downlink Bandwidth Part (BWP) by Listen Before Talk (LBT); and
responding to, by the network device, a random access procedure initiated by a terminal device on the target downlink BWP;
wherein the responding to, by the network device, the random access procedure initiated by the terminal device on the target downlink BWP comprises:
responding to, by the network device, a contention-based random access procedure initiated by the terminal device on the target downlink BWP;
wherein the method further comprises:
configuring a first uplink BWP and a second uplink BWP for the terminal device, so that in response to that the terminal device performs LBT on the first uplink BWP and fails, and a number of failures is greater than or equal to a first threshold value, a currently activated uplink BWP is switched from the first uplink BWP to the second uplink BWP, and in response to that the terminal device performs LBT on the second uplink BWP and succeeds, the second uplink BWP is determined as the target uplink BWP.

12. The method according to claim 11, further comprising:
determining, by the network device, a downlink BWP as the target downlink BWP in response to that the downlink BWP has a same index as the target uplink BWP, wherein the target uplink BWP is the uplink BWP used in response to that the terminal device initiates the random access procedure.

* * * * *